United States Patent [19]
Imamura et al.

[11] Patent Number: 6,130,825
[45] Date of Patent: Oct. 10, 2000

[54] CURRENT-RESONANT SWITCHING POWER SUPPLY

[75] Inventors: Noritoshi Imamura; Katsumi Kobori, both of Miyagi, Japan

[73] Assignee: Sony Corporation, Tokyo, Japan

[21] Appl. No.: 09/266,263

[22] Filed: Mar. 11, 1999

[30] Foreign Application Priority Data

Mar. 17, 1998 [JP] Japan .............................. P10-067326
Jul. 21, 1998 [JP] Japan .............................. P10-204769

[51] Int. Cl.[7] ...................... H02M 3/335; H02M 7/5387
[52] U.S. Cl. ............................................. 363/17; 363/132
[58] Field of Search .................. 363/16, 17, 95, 363/97, 98, 131, 132

[56] References Cited

U.S. PATENT DOCUMENTS

| 5,132,888 | 7/1992 | Lo et al. ..................................... | 363/17 |
| 5,481,449 | 1/1996 | Kheraluwala et al. .................... | 363/17 |
| 5,541,827 | 7/1996 | Allfather .................................... | 363/17 |
| 5,663,877 | 9/1997 | Dittli et al. ............................... | 363/127 |

FOREIGN PATENT DOCUMENTS

| 36 05 417 | 7/1987 | Germany . |
| 37 27 170 | 2/1989 | Germany . |
| 2093643 | 9/1982 | United Kingdom ..................... 363/17 |

OTHER PUBLICATIONS

L. Xiao, et al., "Soft Switched PWM DC/DC Converter with Synchronous Rectifiers", Intelec, International Telecommunications Energy Conference, U.S., New York, IEEE, vol. Conf. 18, Apr. 1996, pp. 476–484

*Primary Examiner*—Matthew Nguyen
*Attorney, Agent, or Firm*—Hill & Simpson

[57] ABSTRACT

In a switching power supply, primary-side MOS transistors are alternately turned on, so that a resonant current flows into the primary winding of a transformer and an alternate power is transferred to the secondary side. The alternate voltage generated at the secondary winding is applied by the voltage generated at the wound-up secondary winding to the gates of secondary-side MOS transistors such that they are turned on respectively in periods when the polarity of the voltage is positive. Rectified currents flow into a capacitor through a choke coil to perform synchronous rectification. If the voltage of a smoothing capacitor becomes higher than the alternate output voltage when the transformer is inverted, reverse currents flow into the secondary-side MOS transistors. With the counterelectromotive force of the choke coil, the reverse currents flowing when the transformer is inverted are suppressed, and the efficiency of the switching power supply is prevented from decreasing.

2 Claims, 5 Drawing Sheets

CURRENT-RESONANT SWITCHING POWER SUPPLY

RELATED APPLICATION DATA

The present application claims priority to Japanese Application Nos. P10-067326 filed Mar. 17, 1998 and P10-204769 filed Jul. 21, 1998 which applications are incorporated herein by reference to the extent permitted by law.

BACKGROUND OF THE INVENTION

1. Field of the Invention

The present invention relates to switching power supply circuits, and more particularly, to a current-resonant switching power supply which is effective when an output voltage is obtained at the secondary side in a synchronous rectifying method.

2. Description of the Related Art

As the use of less energy has been required for Earth environmental protection in recent years, higher efficiency and lower noise are further demanded for various types of switching power supplies.

As power supply circuits for computers and communication units, DC—DC converters which have low noise and which maintain high efficiency even at a low-voltage output are required.

When a low voltage is output, a high output current is generally obtained if a constant power consumption is maintained. In a DC—DC converter, a resistance loss at a rectifying diode in the secondary side becomes a large power loss.

Therefore, it is considered that a current-resonant switching power supply having relatively low noise and high efficiency and a transistor which provides a low on-resistance at the secondary-side output are driven in a synchronous rectifying method to obtain a DC output voltage.

FIG. 4 shows a switching power supply circuit having such a combination. Switching devices Q1 and Q2 are formed of MOS FETs connected in series, and an insulating transformer T transfers a switching power at the primary side to the secondary side.

A power supply control circuit IC alternately opens and closes the switching devices Q1 and Q2, and is usually configured such that a reference voltage is compared with an output voltage $V_O$ by voltage detection means (not shown) to adjust the switching frequency of the switching devices in order to obtain a constant output voltage $V_O$.

The outputs of the switching devices Q1 and Q2 are sent to a primary winding $L_1$ of the insulating transformer T and a resonant capacitor $C_1$. When the switching devices Q1 and Q2 are alternately opened and closed, the primary winding $L_1$ of the transformer is driven by a current that charges and discharges the resonant capacitor $C_1$, which resonates with the leakage inductance of the transformer T. As shown in FIG. 5, a voltage $V_1$ applied to the primary winding $L_1$ causes an induced voltage $V_2$ at the secondary winding $L_2$, and full-wave rectification is applied by one set of rectifying diodes in a usual DC—DC converter.

Since a loss caused by the rectifying diodes, which have relatively high on-resistances, is rather large when an output voltage is low, there is known a circuit in which N-channel MOS transistors Q3 and Q4 are used instead of the rectifying diodes and full-wave rectification is applied in a synchronous method to output the DC voltage $V_O$ from a smoothing capacitor $C_O$, as shown in FIG. 4.

In the circuit shown in FIG. 4, since a full-wave-rectified voltage is accumulated in the smoothing capacitor $C_O$ through the MOS transistors Q3 and Q4 at a low resistance, a relatively low DC voltage $V_O$ can be efficiently output.

Parasitic diodes D are formed due to the structures of the MOS transistors Q3 and Q4.

A current-resonant switching power supply, which has half-bridge connected switching devices, features essential low noise with zero-current switching at turning on and current resonance at turning off, and a wide variable output voltage $V_O$ at the secondary side with a switching frequency being changed. The power supply has in the entire period a rectified current continuous mode in which power is transferred to the secondary side and a secondary-side rectification discontinuous mode in which power is not sent to the secondary side in a period, in order to provide a wide regulation range.

When the switching frequency becomes lower than the resonant frequency due to constant-voltage control, the mode is changed to the secondary-side rectification discontinuous mode. In this case, the rectifying capacitor at the secondary side is not charged for periods t1 in one switching cycle as shown in FIG. 5, and the output voltage $V_O$ is higher than the secondary voltage $V_2$ of the transformer in the periods t1.

Since a reverse current is blocked by diodes, even in such a discontinuous mode in a usual rectification with the diodes, there occurs no problem. In rectification with MOS FET transistors, however, since a reverse current flows, when the transistors are controlled such that they are turned on in the periods, negative-direction currents id1 and id2 flow into the synchronous-rectifying MOS transistors Q3 and Q4 in the periods t1 in the reverse direction, respectively, as shown in FIG. 5.

With these currents id flowing in the negative direction, the MOS transistors Q3 and Q4 generate heat and a switching loss occurs at the primary side.

To solve these problems, it has been considered that control circuits IC1 and IC2, which each have a logic circuit for detecting the output voltage and the current of the transformer T to control the MOS transistors Q3 and Q4, be provided such that the MOS FET transistors Q3 and Q4 are turned on at appropriate times. Since such control circuits IC1 and IC2 need to be prepared separately, however, the cost of a power supply increases and the circuit configuration is made complicated.

When a charging period in which the capacitor $C_O$ is charged becomes short, the peak value of the current accumulated in this period becomes large and a continuity angle becomes small to reduce the power factor of the switching power supply.

SUMMARY OF THE INVENTION

Accordingly, it is an object of the present invention to provide a switching power supply having an improved efficiency.

The foregoing object is achieved according to the present invention through the provision of a current-resonant switching power supply which includes a driving circuit that alternately turns on and off switching devices half-bridge-connected against a DC voltage, and in which an alternate voltage is applied from the connection point of the switching devices to the primary side of an insulating transformer through a resonant capacitor and a predetermined alternate voltage is obtained from the secondary winding of the insulating transformer, the current-resonant switching power supply including a pair of MOS transistors which are controlled at timing when they are alternately turned on, at the output side of the secondary winding, wherein a current rectified by the pair of MOS transistors charges a smoothing capacitor through a choke coil.

The winding for outputting voltages used for driving the MOS transistors can be provided separately from the secondary winding for outputting power.

Since a full-wave-rectified current output from the synchronous-rectifying MOS transistors for charging the smoothing capacitor charges the smoothing capacitor through the choke coil, reverse currents flowing in the reverse direction through the MOS transistors can be prevented from flowing by the counterelectromotive force of the choke coil even in the discontinuous mode, in which the rectified currents are not continuous within one cycle.

As described above, since a current-resonant switching power supply according to the present invention is, especially when a half-bridge current-resonant switching power supply is used with synchronous-rectification rectifying devices, formed of a circuit which easily prevents reverse currents from flowing into the synchronous-rectifying devices, and the peak values of rectified currents are suppressed by an inserted inductor, the distribution angles of the rectified currents become large, and a power factor can be increased.

DESCRIPTION OF THE PREFERRED EMBODIMENTS

Figure 1:
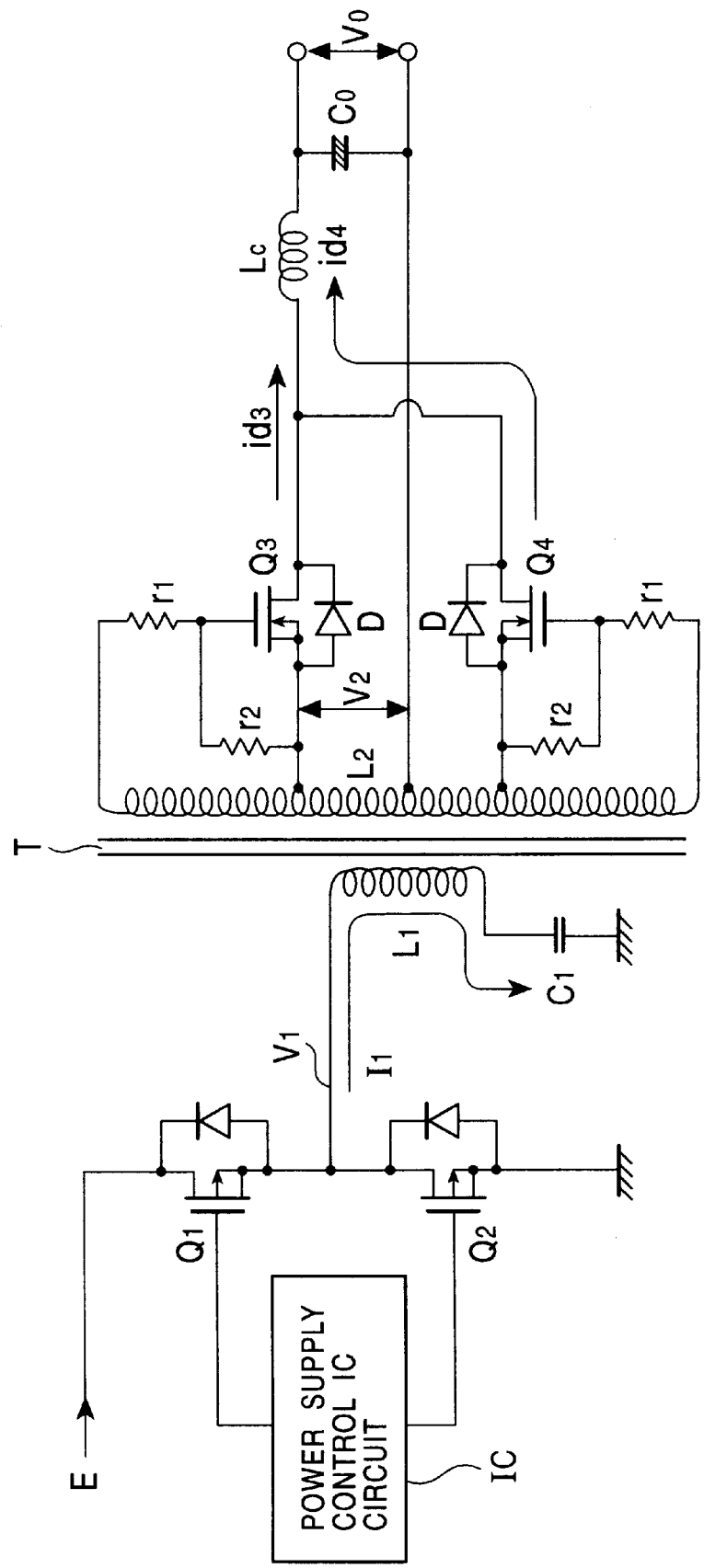
FIG. 1 is a circuit diagram of a switching power supply circuit according to an embodiment of the present invention.
Figure 4:
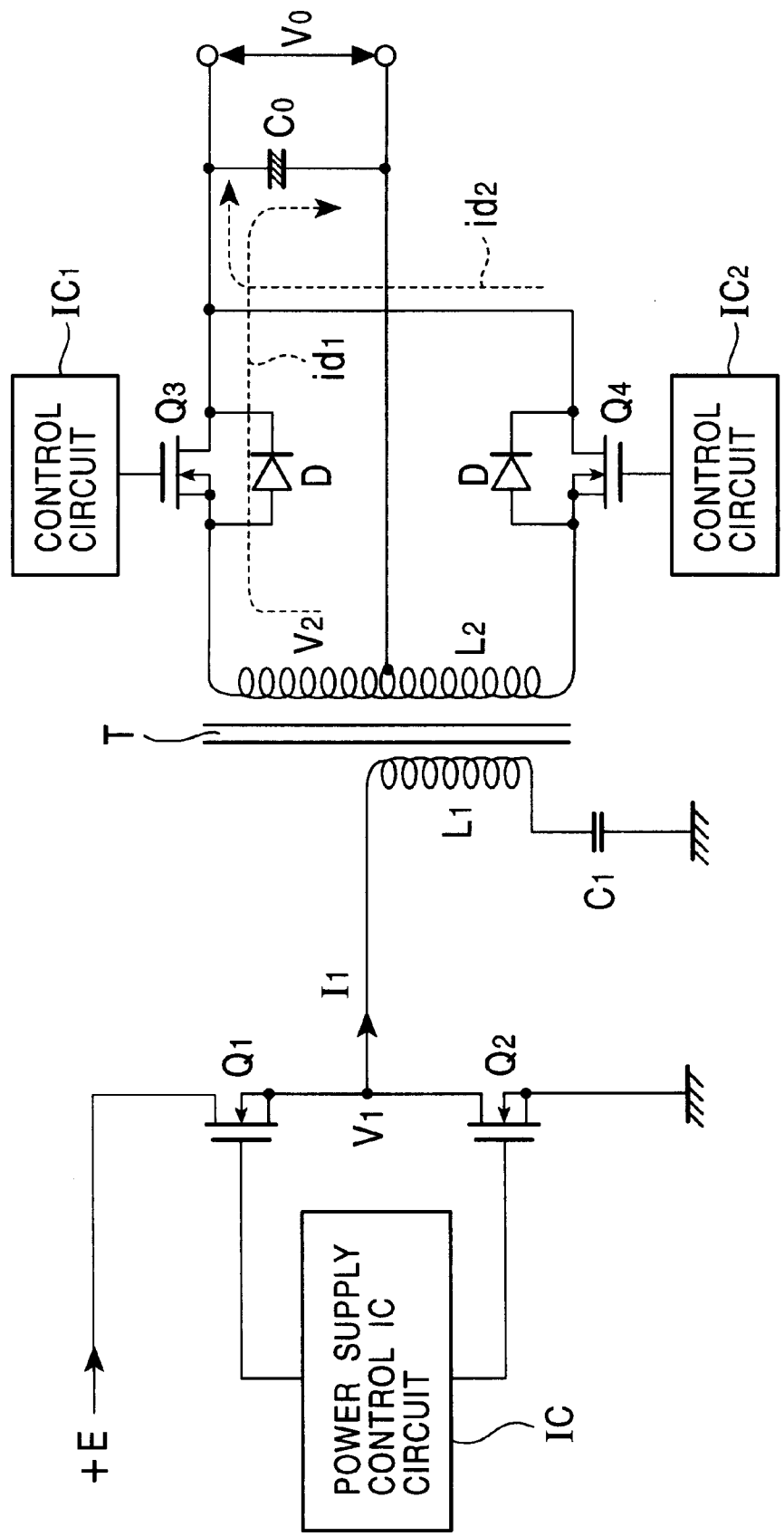
FIG. 4 is a general circuit diagram of a current-resonant switching power supply which employs a synchronous rectification method.

FIG. 1 shows a current-resonant switching power supply circuit according to an embodiment of the present invention. As shown in FIG. 4, switching devices Q1 and Q2 constitute a half-bridge-connected switching circuit and are formed of MOS transistors, and a supply power source E is provided.

The switching outputs thereof are connected to the ground terminal of the supply power source E through the primary winding $L_1$ of a drive transformer T and a resonant capacitor $C_1$.

A full-wave rectification circuit is formed such that the voltage induced at the secondary winding $L_2$ of the insulating transformer T charges a smoothing capacitor $C_0$ through synchronous-rectifying MOS transistors Q3 and Q4 and a choke coil Lc.

This switching power supply is controlled by a winding-voltage detection method in which both ends of the secondary winding $L_2$ are wound up to drive the MOS transistors Q3 and Q4 and the MOS transistors Q3 and Q4 are turned on according to the polarity of the voltage induced in the secondary winding against the ground.

A control IC circuit IC drives the switching devices Q1 and Q2. This IC circuit usually controls a switching frequency so as to maintain an output voltage $V_0$ at a constant voltage, and is allowed to have a protection function which detects an unusual temperature increase of the switching power supply to stop a switching operation.

Resistors r1 and r2 provide gate capacitors with appropriate time constants to set the on timing of the transistors connected.

An operation of the switching power supply will be briefly described below. When the supply power source E is applied, control is performed, for example, such that the MOS transistor Q1 is turned on and the MOS transistor Q2 is turned off. The resonant capacitor $C_1$ is charged through the supply power source E to the MOS transistor Q1 and the primary winding $L_1$ of the transformer.

Control is next performed according to a resonant cycle at the primary side such that the MOS transistor Q1 is turned off and the MOS transistor Q2 is turned on. A resonant current flows from the resonant capacitor C1 to the primary winding L1 of the transformer, and an alternate power is transferred to the secondary side.

The alternate voltage generated at the secondary winding $L_2$ is applied to the gates of the MOS transistors Q3 and Q4 by the voltage formed by the wound-up secondary winding, for example, while the voltage is positive so that the transistors are turned on, and rectified currents id3 and id4 flow into the capacitor $C_0$ through the choke coil Lc to perform full-wave rectification.

A current can flow through parasitic diodes D of the MOS transistors Q3 and Q4 in a period in which the gate voltage of each transistor does not reach the threshold value. The diodes may be externally connected.

Figure 5:
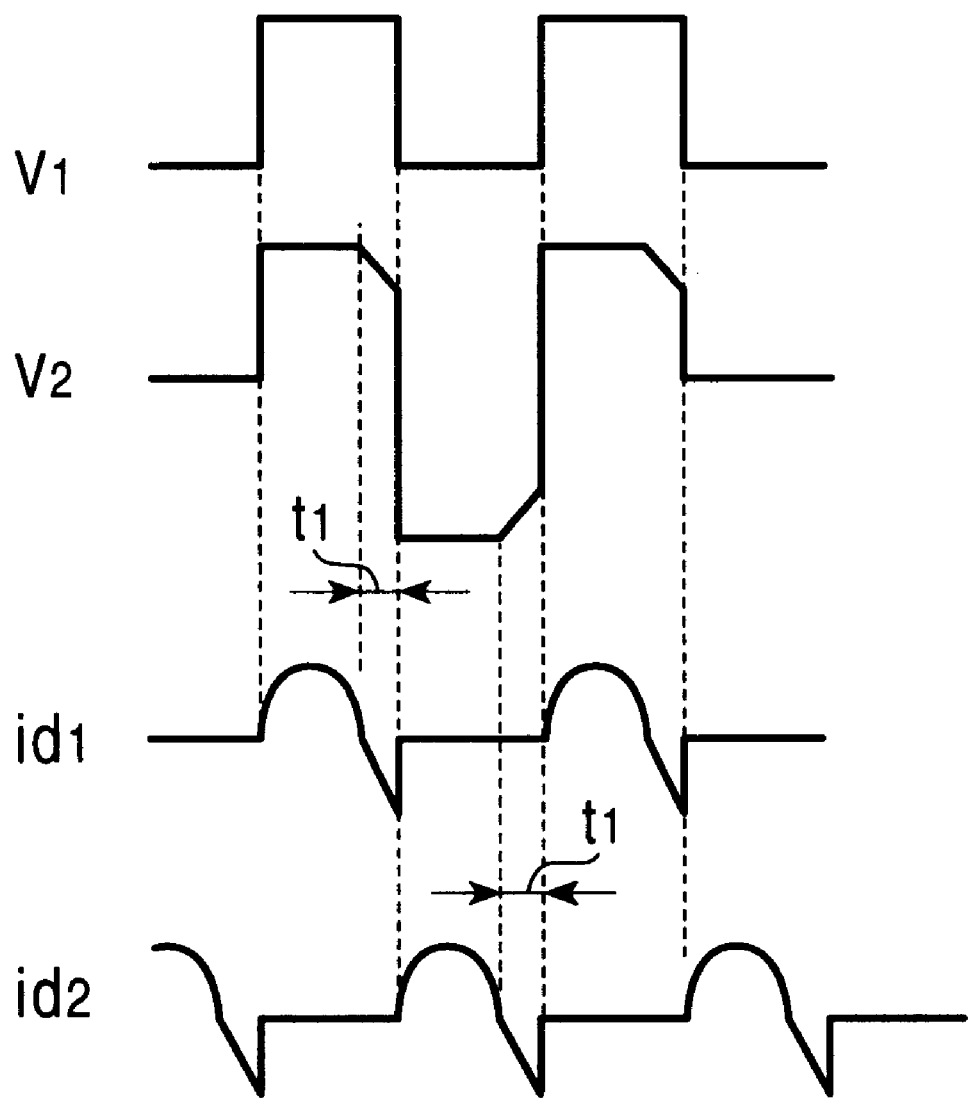
FIG. 5 is a waveform view of reverse currents generated during synchronous rectification.

If a load changes and the output voltage is changed, for example, the switching frequency is set lower than the resonant frequency by constant voltage control, and a reverse current is generated in the discontinuous rectification mode as shown in FIG. 5.

Figure 2:
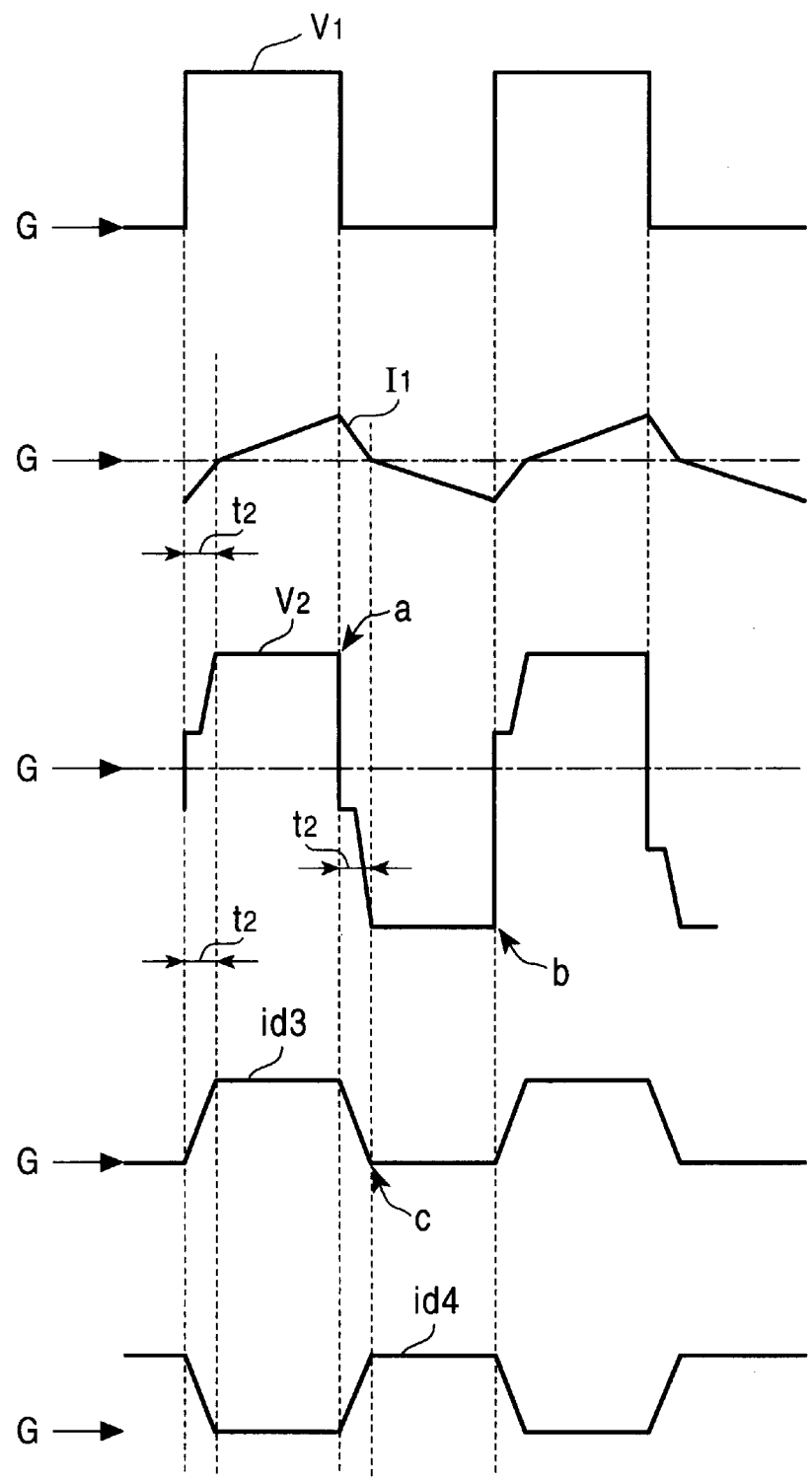
FIG. 2 is a waveform view of a signal at each section shown in FIG. 1 during a switching operation.

In the present invention, however, as shown in switching waveforms of FIG. 2, the voltage $V_2$ induced in the secondary side against the voltage $V_1$ at the primary side has a waveform shown in FIG. 2, and a current $I_1$ at the primary side has a waveform in which the peak value is suppressed by the choke coil Lc. In discontinuous periods $t_1$ shown in FIG. 5, the charging current flowing through the smoothing capacitor at the secondary side disappears irrespective of the condition in which the switching devices in the primary side are not inverted. In these periods, since the MOS transistor Q3 is being driven to be on, the current makes an attempt to flow through the MOS transistor Q3 in the reverse direction.

In the present invention, however, as shown in FIG. 2, the transformer is magnetically inverted at a point "a" and the current id4 starts flowing into the MOS transistor Q4. With the counterelectromotive force of the choke coil, the current id3 continues flowing into the MOS transistor Q3. When the current id3 becomes zero at a point "c," only the current id4 flows through the MOS transistor Q4. In other words, within the periods t2, the output voltage of the transformer is balanced with the counterelectromotive force generated by the inductor of the choke coil, and the current flows in the same direction.

Therefore, the currents continuously flow into the MOS transistors Q3 and Q4 until they become zero, and the reverse currents caused by the transformer which has been inverted do not flow at the point "c," where a current becomes zero.

At a point "b," the relationship between the MOS transistors Q3 and Q4 becomes reverse and the currents flow.

In the present invention, the counterelectromotive force is generated in the choke coil Lc, the current id3 which has been flowing through the MOS transistor Q3 starts attenuating gradually, the transformer is driven in the direction in which the current id4 flows through the MOS transistor Q4, the current flowing through the choke coil Lc changes from the current id3 to the current id4 at the end of the discontinuous period t2, and thus a reverse current is not generated.

As described above, when the inductance of the choke coil is set appropriately, since the power supply can be configured such that a reverse current does not flow in the present invention, the synchronous-rectifying MOS transistors can be driven in the winding-voltage detection method, which is the most simple method.

In addition, since the inductor is inserted into a smoothing section, the distribution angles of the currents flowing through the synchronous-rectifying devices become large and their peak values are suppressed.

Therefore, the power factor is improved. The losses caused by the semiconductor, the transformer, and the smoothing capacitor are greatly reduced.

Figure 3:
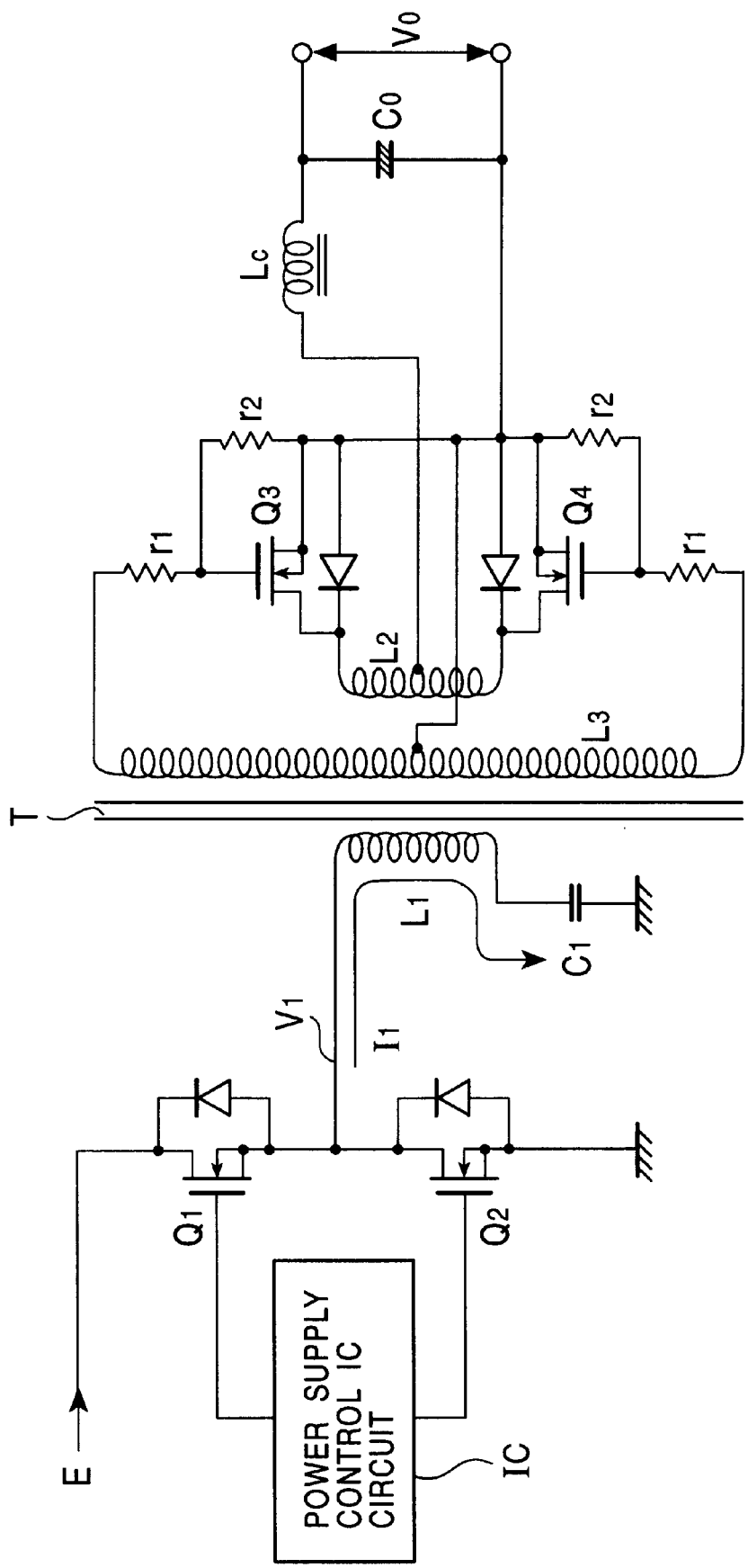
FIG. 3 is a circuit diagram of a switching power supply circuit according to another embodiment of the present invention.

FIG. 3 shows another embodiment of the present invention. The same symbols as those in FIG. 1 are assigned to the same portions. In this embodiment, to output voltages used for driving MOS transistors Q3 and Q4, an independent third winding $L_3$ insulated from a secondary winding is provided.

The third winding drives the synchronous-rectifying MOS transistors Q3 and Q4. The MOS transistors Q3 and Q4 are connected to the ground at the sources, and thereby gate driving is made easy.

What is claimed is:

1. A current-resonant switching power supply which includes a driving circuit that alternately turns on and off switching devices half-bridge-connected against a DC voltage, and in which an alternate voltage is applied from the connection point of the switching devices to the primary side of an insulating transformer through a resonant capacitor and a predetermined alternate voltage is obtained from the secondary winding of the insulating transformer, said current-resonant switching power supply comprising:

a pair of MOS transistors which are controlled at timing when they are alternately turned on, at the output side of the secondary winding, wherein a current rectified by the pair of MOS transistors charges a smoothing capacitor through a choke coil, and wherein the pair of MOS transistors are driven by voltages sent from a third winding which is insulated from the secondary winding.

2. A current-resonant switching power supply according to claim 1, wherein the switching devices are formed of MOS transistors.

* * * * *